United States Patent [19]

Sauder

[11] Patent Number: 4,738,278
[45] Date of Patent: Apr. 19, 1988

[54] HYDRAULIC CONTROL DEVICE

[75] Inventor: Karl Sauder, Zurich, Switzerland

[73] Assignee: Firma Compat Aktiengesellschaft, Fürstentum, Liechtenstein

[21] Appl. No.: 930,085

[22] Filed: Nov. 12, 1986

Related U.S. Application Data

[63] Continuation-in-part of Ser. No. 552,139, filed as PCT EP83/00023, Feb. 1, 1983, published as WO83/02813 on Aug. 18, 1983, abandoned.

[30] Foreign Application Priority Data

Feb. 4, 1982 [AT] Austria .................................. 423/82

[51] Int. Cl.$^4$ ............................................. F15B 13/04
[52] U.S. Cl. ................................ 137/596; 137/596.12; 137/627.5
[58] Field of Search ................. 137/596, 596.12, 627.5

[56] References Cited

U.S. PATENT DOCUMENTS

| | | |
|---|---|---|
| 2,503,827 | 4/1950 | Langmore et al. |
| 3,153,528 | 10/1964 | Seward |
| 3,443,596 | 5/1969 | Klenk ............................ 137/627.5 |
| 3,578,024 | 10/1971 | Hill ................................ 137/627.5 |

FOREIGN PATENT DOCUMENTS 2088976 1/1972 France .
1009729 11/1965 United Kingdom .

Primary Examiner—Gerald A. Michalsky
Attorney, Agent, or Firm—Toren, McGeady & Associates

[57] ABSTRACT

A hydraulic control device consists of a housing, a control slide valve displaceable in a bore of the housing, and a control ring. Axial displacement of the control slide valve makes it possible to connect together or to disconnect various connecting lines depending upon the position of the valve. Located in an annular chamber, formed between a section of the housing bore and the control slide valve is a control ring arranged coaxially with the valve and guided displaceably thereupon. Valve seats are spaced axially from each other both in the housing bore and on the control slide valve. The control ring comprises inner mating surfaces and outer mating surfaces cooperating with the valve seats. Provided between the two valve seats in the control slide valve is a flow channel running therein which is closed at one end depending upon the position of the control ring. The latter is held by the pressure of the flowing medium in the appropriate closed position, but the changeover may be effected independently of the pressure since no axial forces are applied to the control slide valve by the flowing medium.

6 Claims, 2 Drawing Sheets

HYDRAULIC CONTROL DEVICE

The present application is a continuation-in-part of U. S. application Ser. No. 552,139 filed as PCT EP83/00023, Feb. 1, 1983, published as WO83/02813 on Aug. 18, 1983.

The present invention relates to valve assemblies in general and more particularly to a hydraulic control unit which may operate to selectively interconnect a plurality of hydraulic control lines.

The device of the invention is of the type which comprises a housing with a slide control valve displaceable within a bore of the housing with two valve seats being defined within the housing bore spaced axially apart from each other. The control unit of the type to which the present invention relates will also include a plurality of connecting lines which are intended to be connected together or disconnected during operation of the control unit of the invention depending upon the position of the slide control valve.

Routing valves of the type here involved operate to control starting, stopping and direction of flow of a pressurized fluid medium. As a result of this operation, there is determined the direction of movement or a holding or stationary position of a device such as a cylinder or hydraulic motor. Depending upon the design of the routing valves, they may be divided into two groups, namely seated routing valves and sliding routing valves. Seated valves differ basically from sliding valves in that the seated valve provides a leak-proof shutoff which cannot be obtained with a sliding valve because of the necessary clearance between a piston and the valve housing. The seating element is usually a ball which, in its starting position, is held to a valve seat by a spring. Valves of this kind may be used for pressures of up to 700 bars, but only in small sizes (up to a rated diameter of 6 mm).

In cases where a plurality of flow passages and switching positions are involved, a plurality of ball valves is required. In such cases, therefore, several seated routing valves are combined accordingly and seated valves of this kind may therefore be used only up to a specific valve seat diameter and control slide valve diameter since, otherwise, the force required for changeover against a prevailing hydraulic pressure can become excessively large.

The most frequently used routing valve design is the slide valve. The advantages of this configuration arise as a result of its relatively simple design, the relatively higher switching capacity which is obtainable and, more particularly, the multiplicity of possible control functions which are available. In the case of a control slide valve, the valve is adapted to move in the bore of a housing and to open or close connecting lines depending upon its position in the bore. However, hydraulic control units in the form of a sliding valves can be used only up to a maximum pressure of 350 bars.

Known in the prior art are 2/2 and 3/2 seated valves with direct magnetic operation in which two valve seats spaced one from the other are arranged in a housing bore, with the control slide valve constituting the body of the valve and operating so as to come to rest upon the appropriate valve seats depending upon the flow routing which is required. The closing pressure of these valves is increased by the action of hydraulic pressure, but this additional pressure also opposes changeover of the valve member. In order to achieve some compensation, counter-pressures must be built up and this is achieved by directing hydraulic pressure to opposing ends of the control valve slide. With these two switching positions, such seated valves can provide as a rule only two, or at best, three directions of flow.

The present invention is directed toward providing a hydraulic control valve unit combining the advantages of the sliding valve design with those of seated valves so that very high pressures can be withstood regardless of structural size and so that the force required for changeover of the valve is independent of pressure.

SUMMARY OF THE INVENTION

Briefly, the present invention may be defined as a hydraulic control valve assembly having a housing with wall means defining a bore and a control slide valve displaceable within said bore. A control ring is coaxially arranged on the control slide valve so as to be axially displaceable relative thereto within an annular chamber formed between the control slide valve and portions of the wall means forming a segment of the bore. A plurality of connecting lines are defined within the housing which are connected in flow communication with each other or reciprocally blocked, respectively, in dependence upon the position of the control slide valve and of the control ring in order to control flow through the hydraulic control device. An axially extending fluid flow channel is defined within the slide valve and a first pair of valve seats spaced axially from each other are defined on the housing within the housing bore for engagement by the control ring. A second pair of valve seats spaced axially from each other are defined on the control slide valve for engagement by the control ring and each of the valve seats of the first and second pairs of valve seats are defined between a cylindrical surface on one side thereof and a radial plane surface on the other side thereof. The connecting lines include a first connecting line discharging into the annular chamber between the first pair of valve seats, a second and a third connecting line discharging into the annular chamber, respectively, at opposite sides externally of the first pair of valve seats and a fourth connecting line discharging into the annularly extending fluid flow channel. The control ring is formed with end areas defining outer conically shaped mating surfaces and inner funnel shaped mating surfaces having smaller surface areas than the outer mating surfaces, with the outer mating surfaces engaging the first pair of valve seats to effect a fluid-tight seal therebetween and with the inner mating surfaces engaging the second pair of valve seats to provide a fluid-tight seal.

Connecting apertures formed in the control slide valve join in flow communication the fluid flow channel and the annular chamber.

The second pair of valve seats are spaced from each other a greater distance than the first pair of valve seats and the length of the control ring is smaller than the axial spacing between the second pair of valve seats. The connecting apertures are located between the second pair of valve seats in the range of displacement of the control ring on the slide valve and the slide valve and the control ring operate to control and direct fluid flow between the connecting lines through the hydraulic control valve device.

With an arrangement in accordance with the present invention, it is insured that, although the control ring is held in the appropriate position by the pressure of a flowing medium, the hydraulic control valve unit will still be capable of being changed over to another setting independently of the pressure. None of the forces produced by the flowing medium are applied axially to the control slide valve itself so that, in order to adjust the valve, all that must be overcome, at least in one sliding direction, is the small force of any compression spring that may be provided and the contact pressure of seals in the assembly. However, as soon as there is a slight movement of the control slide valve, an annular gap is opened between the corresponding inner mating surfaces of the control ring and the associated valve seat on the control slide valve, and, thus, pressure is immediately released or the same pressure will obtain on both sides of the control ring, whereby when the control slide valve moves further, the control ring may also be moved without the use of any additional force until it again reaches the opposing switching position.

The invention thus provides seated valves in which the changeover force is independent of the pressure. This enables the use of hydraulic control valve units of the type involved to be used with correspondingly large housing bore diameters, and, therefore, also with large flow volumes. Despite this advantage, however, the advantages of a sliding valve are also obtained in that a 4/2 way valve, i.e., a valve having four flow directions and two switching positions, can be obtained. Such a hydraulic control valve unit is suitable for very high pressures regardless of structural size, whereas, conventional seated valves are suitable for high pressures only with small rated diameters. Sliding valves cannot handle such high pressures.

In spite of its relatively simple design, the hydraulic control valve unit of the invention may be changed over independently of pressure and may be used at very high pressures and also for large volume throughputs.

The present invention, therefore, represents a considerable improvement in the art as compared with known designs since, despite its simple design and the simplicity of the switching procedures independently of pressure, it may be used with the highest pressures for small and large volume throughput.

The various features of novelty which characterize the invention are pointed out with particularity in the claims annexed to and forming a part of this disclosure. For a better understanding of the invention, its operating advantages and specific objectives attained by its use, reference should be had to the drawings and descriptive matter in which there is illustrated and described the preferred embodiment of the invention.

DETAILED DESCRIPTION OF THE PREFERRED EMBODIMENT

Figure 1:
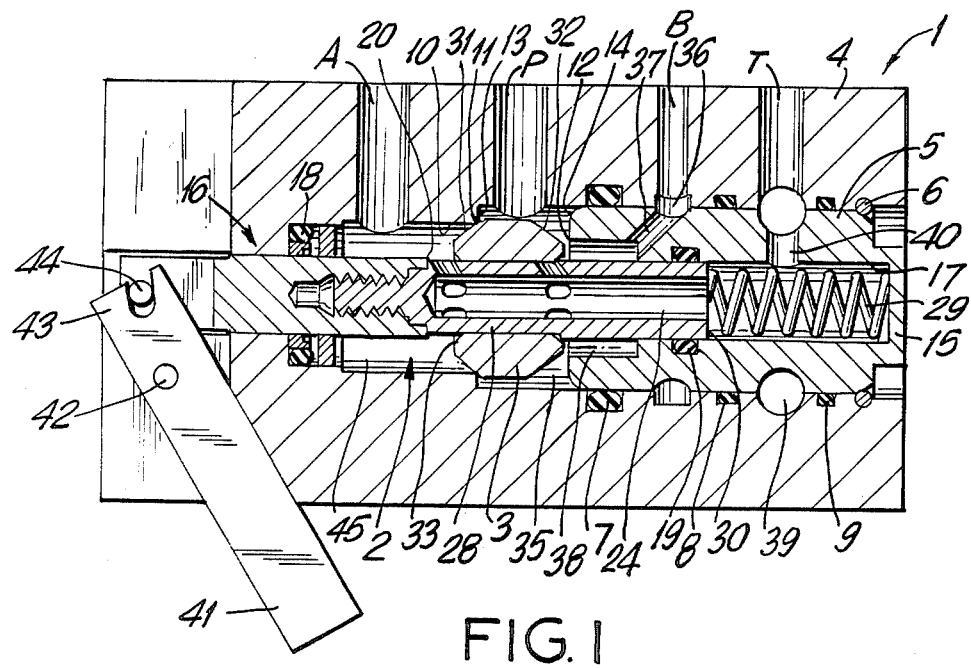
FIGS. 1-3 are each horizontal sectional views taken through a hydraulic control valve unit according to the invention showing the valve unit in different operating positions.

Referring now to the drawings, it will be seen that the hydraulic control valve unit of the present invention consists essentially of a housing 1 having defined therethrough a housing bore 10 and connecting lines A, P, B and T. The housing 1 is formed in two parts and consists of a main body 4 and a tubular insert 5, an arrangement which is necessary simply for design reasons. Operatively positioned within the housing bore 10 are a control slide valve 2 and a control ring 3. The insert 5 is arranged to be stationary within the main body 4 of the housing with movement thereof being prevented by means of a locking ring 6.

Inserted between the main body 4 and the insert 5 are several sealing rings or gaskets 7, 8 and 9. The housing 1 formed by the main body 4 and insert 5 encloses the housing bore 10 which is formed with a stepped configuration. Provided within the housing bore 10 are two valve seats 11 and 12 which are spaced axially apart. In the interest of design simplicity, the valve seat 11 is formed by the main body 4 of the housing 1 and the valve seat 12 is formed by the insert 5. In order to allow sufficient wall thickness for the insert 5, the two valve seats 11, 12 are of different diameters, but it would be conceivable to make the valve seats of the same diameter. In this design, therefore, the valve seats 11 and 12 are defined by cylindrical surfaces running axially and formed by housing bore 10 and by radial planes 13, 14. This structural arrangement produces valve seats having appropriately sharp edges.

The insert 5 and the housing 1 has a closed base 15 and the housing is therefore closed off from the outside by the base 15.

The control slide valve 2 is axially displaceable within the housing 1 and is guided in a front part 16 of the main body and in a bore 17 of the insert 5. Sealing is provided in the end areas by sealing rings 18 and 19. The control slide valve 2 is provided with two valve seats 20 and 21 spaced axially apart, the valve seats 20, 21 being defined, on the one hand, by the surface of the control slide valve and, on the other hand, by surfaces running radially inwardly. Located between the valve seats 20, 21 are connecting apertures 22, 23 which run into a duct or fluid-flow channel 24 extending axially within the control slide valve. The duct 24 is open toward one end of the control slide valve 2 where it opens into a chamber 25 enclosed by the insert 5.

As will be evident from the drawing, the distance between the valve seats 20, 21 on the control slide valve 2 is greater than the distance between the valve seats 11, 12 in the housing bore 10. Thus, travel of the control slide valve 2 is longer in spite of the fact that travel of the control ring 3 is shorter. In spite of this, there is an adequate flow of pressure medium connecting apertures 22, 23 formed in the control slide valve 2 at the respective terminal positions. The control slide valve 2 consists of two components 26 and 27 which are axially consecutive and which are secured to each other, with each of these components comprising one of the two valve seats 20, 21. In this manner, there may be structurally obtained between the valve seats a section 28 of smaller diameter than the remainder of the valve. This is also a simple way of producing not only the valve seats, but also the guide for the displaceable control ring 3. Components 26, 27 are united quite simply by a threaded connection and, in the embodiment illustrated, the end of component 27 is in the form of a threaded pin, while the corresponding end of the component 26 has a threaded hole. The two components are accurately aligned by means of mutual centering surfaces.

The actuating component 26 of the control slide valve 2 may be expanded conically toward the end thereof adjacent the control ring with a relatively small amount of taper, whereby the difference in its diameter over a length of about 1 cm may vary by about 0.1 mm. In this manner, the closed position of the control ring may be assisted by hydraulic pressure since, in this direction, the control slide valve 2 must be held in the operative position against the force of a spring 29. In this case, therefore, the holding position is assisted by hydraulic pressure and the taper may be made sufficient to practically eliminate the force of the spring or to ensure that the force acting upon the control slide valve is somewhat greater than the opposing spring force. Thus, all that will be required to release the valve and to change it over to the other setting is a slight impact. In spite of this, the action of the spring 29 in the other setting is correspondingly strong.

Where actuation by electromagnetic means is involved, the spring 29 may, of course, be omitted since the necessary changeover force will be supplied electromagnetically. In order to insure a corresponding pressure upon the valve seats in both directions, it is therefore possible for the areas adjoining the valve seats 20 and 21 on both sides to taper conically toward the end of the control slide valve 2 at least over a short distance. Here again, the difference in diameter over a length of 1 cm may, for example, be about 0.1 mm. The thicker sections of the control slide valve may merge directly into valve seats 20, 21, thereby insuring that, in both terminal positions of the valve, and therefore also of the control ring, a suitable closing pressure is available. In order to adjust the control slide valve against this closing pressure, all that is required is a small force which may easily be applied either electromagnetically or manually.

It is possible within the scope of the invention to provide a shoulder in the immediate vicinity of one of the valve seats 20 or 21, or also of both valve seats 20, 21, the diameter of this shoulder being slightly larger than that of the control slide valve. This may also produce a lower closing pressure, but this may again be overcome quite simply with the necessary switching procedures.

Inserted into a chamber 25 defined within the insert 5 is a compression spring 29 having one end resting upon the base 15 of the insert 5 and an opposite end resting against an end surface 30 of the control slide valve 2. Thus, the control slide valve 2 is thus retained in a spring-loaded position shown in FIG. 1. When the hydraulic control unit is therefore changed over, all that must be overcome is the force of the spring 29.

The control ring 3 which is displaceably held upon a section 28 of the control slide valve 2, coaxially surrounds the valve 2 and it comprises inner mating surfaces 33 and 34 cooperating with corresponding valve seats 11, 12 and 20, 21. Mating surfaces 31 to 34 are formed at the end areas of the control ring 3, outer mating surfaces 31, 32 being conical while inner mating surfaces 33, 34 are funnel shaped. This produces a more satisfactory closure engagement between the valve seats and the mating surfaces, thus making it possible to reliably shut off fluid flow even at very high pressures.

The area of the outer mating surfaces 31, 32 is larger than that of the inner mating surfaces 33, 34, and, thus, the control ring may be designed as a symmetrical turned part, although valve seats 11, 12 are of different diameters. Moreover, the length of the control ring, as viewed in the axial direction, is less than the distance between valve seats 20, 21, on control slide valve 2, but is more than the distance between valve seats 11, 12 in the housing bore 10. When the passage is open, this produces larger passage areas at outer valve seats 11, 12, thus requiring less displacement. Furthermore, the range of travel upon the control slide valve is made greater in order to provide adequate opening of the apertures 22 to duct 24.

Control ring 3 is therefore inserted into an annular chamber 35 between the housing bore 10 and control slide valve 2, the arrangement of the annular chamber and of additional annular chambers 38, 45 providing a simple means for feeding connecting lines A, P, B and T. Line P through which the pressure medium passes opens in the area between valve seats 11, 12 into annular chamber 35. The connecting lines A and B open in on both outer sides of the valve seats with line A opening into the annular chamber 45 and line B passing through an annular duct 36 and connecting ducts 37 to annular chamber 38 between control slide valve 2 and insert 5. The connecting line T, which acts as a return line to a storage tank, opens through an annular duct 39 and one or more feed apertures 40 into chamber 25 within the insert 5 and is thus in communication with duct 24 within control slide valve 2.

As has been previously mentioned, the valve seats 11, 12 and 20, 21 are formed by parts of the device which have sharp edges, but it will be obvious that they could also be provided with a slight chamfering. It would also be possible to provide on the control ring 3, in place of the conical or funnel shaped mating surfaces 31, 32 and 33, 34, mating surfaces which run in radial planes, whereby the same sealing effect might be obtained by an appropriate design of valve seats 11, 12 and 20, 21. It would also be possible, for example, to provide special processing, e.g., lapping of cooperating valve members and valve seats in order to achieve appropriate sealing also in the high pressure range. However, in any case, a suitable arrangement of conical and funnel shaped mating surfaces is preferable.

In the embodiment illustrated, adjustment of the control slide valve 2 is effected by a hand lever 41 which is mounted upon the housing 1 so as to be rotatable about an axis 42. One arm 43 of the lever 41 engages a pin 44 in the vicinity of the free end of the valve.

Figure 4:
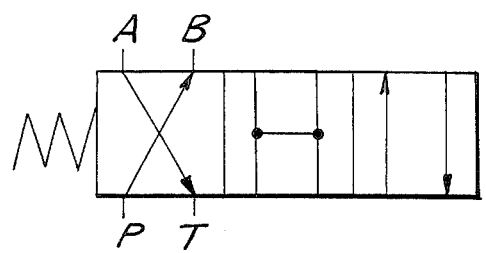
FIGS. 4 and 4a are schematic diagrams showing schematically the possible passages which may be developed through the hydraulic control valve unit.

As will be seen from FIG. 4, the hydraulic control unit according to the invention is a 4/2 way valve with the individual switching positions being shown diagrammatically in FIG. 4. It is possible to connect line P with line B and, at the same time, line A with line T. In an intermediate position, it is also possible to connect all four lines A, B, P, T together. In a second position, lines A and P and lines B and T are respectively connected together.

The operating cycle and individual settings of the hydraulic control valve unit will now be explained in greater detail with reference to FIGS. 1 to 3. A unit of this kind may be used, for example, to actuate a hydraulic piston which is required to be adjusted in both directions of the pressure medium. It may therefore become necessary, on the one hand, to apply pressure to one end of the piston and, on the other hand, to drain hydraulic fluid from the opposite side of the piston. When the piston is to move in the other direction, the feed and return of the hydraulic fluid must be reversed.

In the setting shown in FIG. 1, mating surface 31 of the control ring 3 lies at the valve seat 11, while mating surface 34 lies at the valve seat 21. The control slide valve 2 is in its neutral position under the action of spring 29. In this setting of the valve 2 and control ring 3, the pressure medium fed through connecting line P passes along the outside of the control ring 3 to the annular chamber 38 and then through connecting ducts 37 and annular duct 36 to the connecting line B. At the same time, in this setting, line A is connected to line T through annular chamber 45, connecting aperture 22, duct 24, chamber 25, feed aperture 40 and annular duct 39, the returned medium thus passing back to the storage tank. The control ring 3 is caused to bear upon valve seats 11, 21 by spring 29 and this is assisted by the force of the pressure medium acting axially upon the control ring.

If now the hydraulic control unit is to be changed over, the control slide valve 2 may be displaced axially by actuating the hand lever 41, this displacement being effected as a result of the special design of the invention, independently of pressure, i.e., the pressure medium applies no axial pressure to the valve. As soon as the valve has moved by an appropriate amount, the valve seat 21 separates from the mating surface 34 of control ring 3 immediately relieving pressure upon the pressure medium fed through the connecting line P since a connection is also made to pressureless connnecting line T. This setting is shown in FIG. 2 in which all of the connecting lines A, P, B and T are in communication with each other.

As the control slide valve 2 continues to move, the valve seat 20 stops at mating surface 33 of control ring 3 which is therefore carried along with the valve until mating surface 32 comes to rest upon the valve seat 12. At this time, connecting line P is connected to connecting line A while the returned pressure medium may be passed through the line B to line T and thus back to the storage tank. The pressure now built up in connecting lines P and A and in annular chambers 33, 34 assists in the closing movement of control ring 3, although hand lever 41 must be held in this position. However, this presents no problem for short-term changeovers since only the force of the spring 29 must be overcome.

Even when this setting is released, no problems will arise as a result of axial pressure by the fluid medium upon the control ring 3 since the control slide valve 2 may be adjusted independently of the pressure so that connecting aperture 22 is opened after a small movement and the pressure drops.

It is also possible to actuate the control slide valve by means other than the manual lever 41. For example, mechanical means may be utilized or additionally or alternatively, hydraulic or pneumatic means or electrical or electromagnetic means may be provided, in the case of which, the spring 29 is thus not absolutely necessary.

As has been mentioned previously, the housing is in two parts including a main body 4 and an insert 5. Of course, the housing could be made in two sections taken in the axial direction, the sections being then joined by screws running parallel to the axis of the housing. It would also be possible to use a threaded joint, one part of the housing being provided with a threaded bore and the other with a threaded ring. A configuration of this type would make it possible to eliminate a series of annular ducts necessary to provide a seal between the main body 4 and the insert 5. In this case, the only seals required would be at the two outlet ends of the control slide valve.

In the embodiment illustrated, connecting apertures 22, 23 in the form of radial passages are arranged directly adjacent the valve seats 20, 21 and inclined at an acute angle relative to the connecting end of the duct 24 for the purpose of achieving improved flow conditions. Apertures 22, 23 could be replaced with continuous slots between the valve seats 20 and 21. Also, at the inner surface of the control ring 3 or at the surface 28 of control slide valve 2, grooves could be provided which could then communicate, if necessary, through the additional arrangement of an annular duct through corresponding connecting apertures with duct 24. In all of these cases, there exists the possibility of providing a connecting aperture to duct 24 as soon as the valve seat 20, 21 moves away from the corresponding mating surface 33 or 34 of control ring 3. Additionally, the relevant opposing side is then provided with an adequate path for the return of pressureless medium.

It should be understood that other structural modifications are also possible within the scope of the invention, with two valve seats spaced from each other always being provided both on the control slide valve 2 and in the housing bore 10 as well as a control ring axially displaceable along the valve. The feed to individual connecting lines is of course determined accordingly by the design of the invention. Various other possibilities may be incorporated into the valve housing 1 and such arrangements may increase or improve the applications of the hydraulic control unit accordingly. It is possible, for example, to use pressure reducing valves in the valve housing 1 between connecting lines A and B running to a device which is to receive the fluid medium. Pressure reducing valves could also or alternatively be used between connecting line P, supplying the pressure medium, and return line T extending to a storage tank. This is of particular advantage if different pressures are required in lines A and B. A pump could be used to deliver the pressure medium at a pressure of 1,000 bars and to reduce the pressure to 800 bars in the direction of the one pressure circuit and to 300 bars in the direction of the other pressure circuit. Such pressure reducing valves may have a set or variable adjustability.

Connecting lines A and B may also be provided with releasable double check valves so that a pressure buildup in one line A or B releases the check valve in the other line B or A. The resulting switching positions in passages may be gathered from the diagrammatical illustration of FIG. 4 and this may be accomplished, for example, by means of a double-acting piston which, with its projecting sensors, opens the check valve located on a pressureless side. This considerably extends the range of applications of the hydraulic control unit since it provides positive coverage of the two valve positions. Thus, complete pressure equalization is no longer provided in the central setting and this is highly important in the case of hydraulic drives or hoists.

Figure 4A:
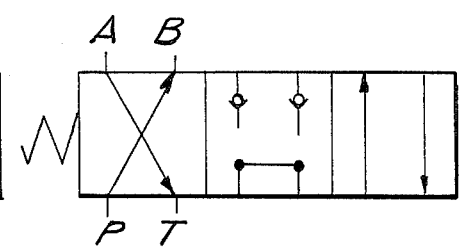
Figure 5:
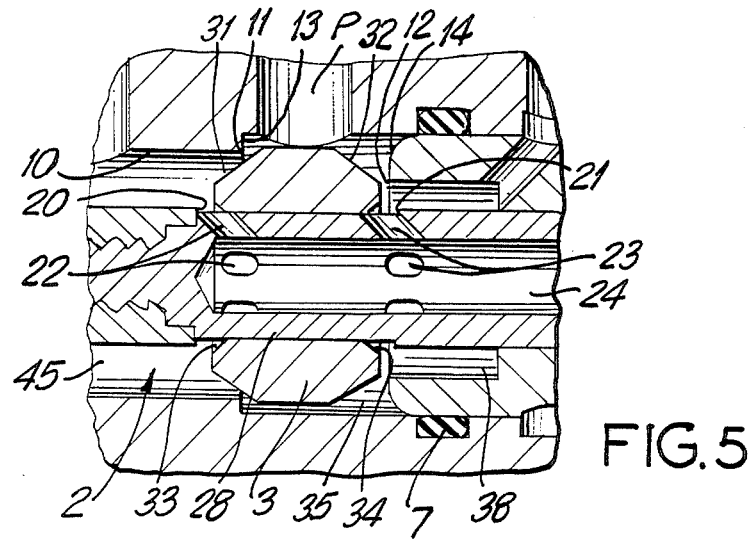
FIG. 5 is a sectional view taken on an enlarged scale showing the area of the unit around the control ring.

Of course, it will be evident that FIG. 4a also depicts a switching arrangement for the hydraulic control valve unit of the present invention.

In the operation of the invention whereby the lines A, P, B and T are selectively interconnected as indicated in FIGS. 4 and 4a, after displacement of the control slide valve 2, the control ring is displaced by pressure in the chamber 45. As previously indicated, with subsequent movement of the control slide valve 2, the valve seat 20 abuts at the fitted surface 33 of the control ring 3 so that it is then picked up and carried in the direction of adjustment of the control slide valve 2 up to the point where the slide valve 2 abuts with its left surface 32 at the valve seat 12. The showing in FIG. 2 should be understood as indicating a possible position of the control ring, because in the unloaded position, it could very easily remain in the position shown in FIG. 1, since the control ring 3 is retained to be freely displaceable upon the slide valve 2 and it could very easily assume this position.

Figure 2:
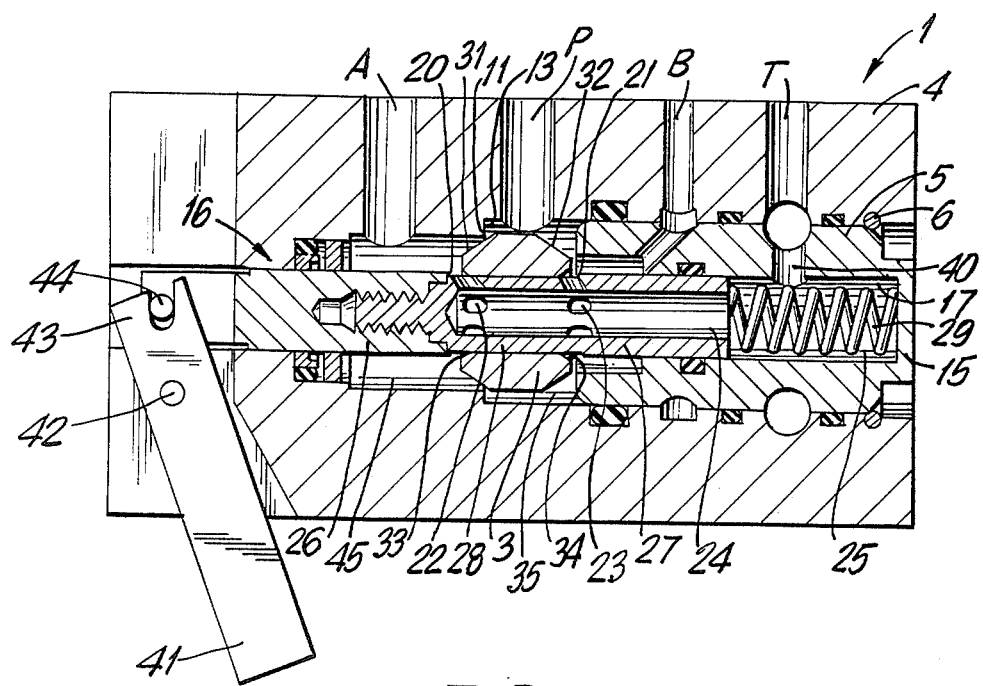
Figure 3:
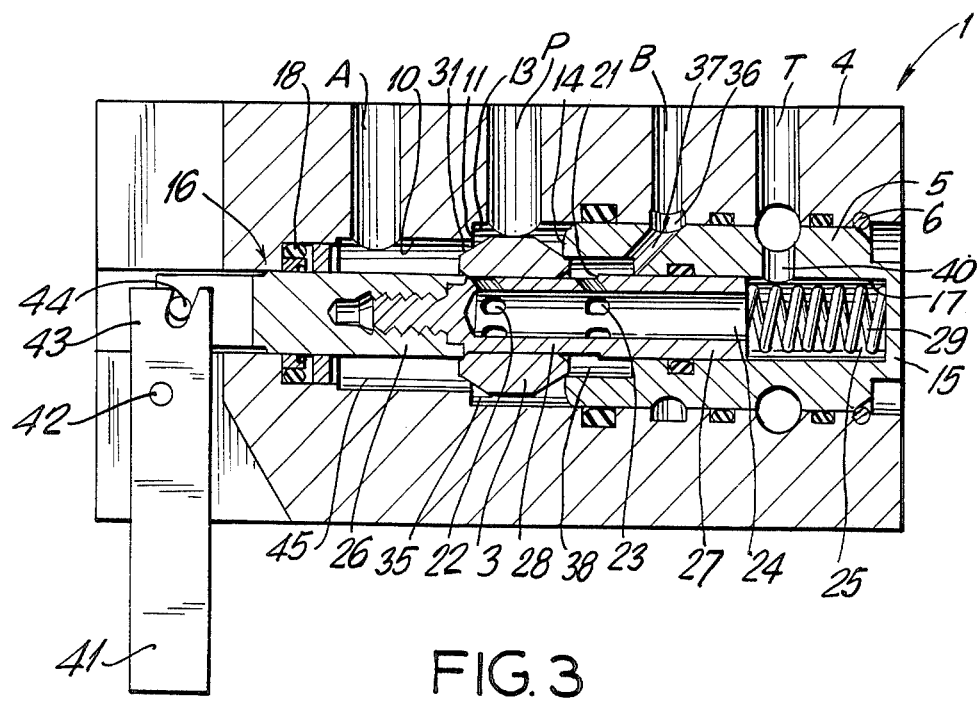

It should further be understood that in the operation of the device of the present invention, during the switchover period which is represented in FIG. 2, it becomes completely immaterial the position in which the control ring 3 is located. With reference to the manner of operation of the control ring 3, it should be understood that the fluid pressure on the control ring 3 will be generally equal on all exposed sides thereof within the chamber or bore 10. It thus could be posible that the control ring with its mating surface or face 31 will remain in contact with the valve seat 11 long enough that a displacement of the control ring to the right will occur by contact of the valve seat 20 at the control ring 3 with the mating surface 33 of the ring 3. It will therefore be understood that there does not occur a pressure load in one or the other direction of the control ring 3 since the same pressure will exist on the entire external periphery of the surface of the control ring in this position, and, thus, all the connecting lines will be open with respect to each other. Therefore, the same pressure will apply everywhere so that, because of this existing pressure of the medium, the control ring 3 will be displaced neither toward the left nor toward the right as will be evident by the fact that pressure is applied equally on all sides thereof.

It can therefore be seen, once again, that the position of the control ring 3 in FIG. 2 is shown to be as indicated purely at random in order to clarify that all of the passages within the hydraulic control device are connected with each other. Of course, the control ring 3 could be shown in such a position that the mating surface 31 rests at the valve seat 11.

It will thus be seen that the control ring will not be forced to move to either side because of pressure differences and that this is true because equal pressure will exist on both sides of the control ring, and, thus, no excess force will develop toward one side or the other. Although there are differences in the fact that the mating surface 31 will have larger areas on one or the other side of the valve seat 11, this should however be countered by the fact that corresponding pressure acts upon the entire mating surface 32, whereby the application of force from both sides will be exactly the same.

Accordingly, it will be seen that the hydraulic valve of the present invention can be utilized in many applications where switching of different supply and drainage possibilities must be assured and, of course, particularly where such switching must occur at high pressures.

With a device in accordance with the present invention, it will thus be found possible to produce a hydraulic control valve unit which offers substantial improvements over prior art devices and which provides greater reliability and a wider range of applications as compared with existing units.

Of course, it should be understood that although the specification deals with a hydraulic control valve unit, the invention applies equally to pneumatic control units.

While a specific embodiment of the invention has been shown and described in detail to illustrate the inventive principles, it will be understood that the invention may be embodied otherwise without departing from such principles.

What is claimed is:

1. A hydraulic control device comprising:
   a housing having wall means defining a bore;
   a control slide valve displaceable within said bore;
   a control ring coaxially arranged on said control slide valve, so as to be axially displaceable thereon within an annular chamber formed between said control slide valve and portions of said wall means forming a segment of said bore;
   a plurality of connecting lines defined within said housing connected in flow communication with each other or reciprocally blocked, respectively, in dependence upon the position of said control slide valve and of said control ring to control flow through said hydraulic control device;
   an axially extending fluid flow channel defined within said slide valve;
   a first pair of valve seats spaced axially from each other defined on said housing within said housing bore for engagement by said control ring;
   a second pair of valve seats spaced axially from each other defined on said control slide valve for engagement by said control ring;
   each of the valve seat of said first and second pairs of valve seats being defined between a cylindrical surface on one side thereof and a radial plane surface on the other side thereof;
   said connecting lines including a first connecting line discharging into said annular chamber between said first pair of valve seats, a second and a third connecting line discharging into said annular chamber, respectively, at opposite sides externally of said first pair of valve seats and a fourth connecting line discharging into said axially extending fluid flow channel;
   said control ring being formed with end areas defining outer conically shaped mating surfaces and inner funnel shaped mating surfaces having smaller surface areas than said outer mating surfaces, said outer mating surfaces engaging said first pair of valve seats to effect a fluid-tight seal therebetween and said inner mating surfaces engaging said second pair of valve seats to effect a fluid-tight seal therebetween; and
   connecting apertures formed in said control slide valve joining in flow communication said fluid flow channel and said annular chamber;
   said second pair of valve seats being spaced from each other a greater distance than said first pair of valve seats with the length of said control ring being smaller than the axial spacing between said second pair of valve seats;
   said connecting apertures being located between said second pair of valve seats in the range of displacement of said control ring on said slide valve;
   said slide valve and said control ring operating to control and direct fluid flow between said connecting lines through said control device.

2. A hydraulic control device according to claim 1, wherein said control slide valve is formed with a larger diameter portion and a smaller diameter portion and wherein said control ring is guided upon said control slide valve on said smaller diameter portion between said second pair of valve seats.

3. A hydraulic control device according to claim 1, wherein said connecting apertures are formed as radial bores in said control slide valve located directly adjacent said second pair of valve seats and located within the displacement path of said control ring relative to said control slide valve.

4. A hydraulic control device according to claim 3, wherein said connecting apertures are formed as bores in said control slide valve which are inclined at an acute angle with respect to the direction in which said axially extending fluid flow channel extends.

5. A hydraulic control device according to claim 1, wherein said fluid flow channel is open at one end of said control slide valve and discharges at its opposite end into a chamber having therein a spring applying an axially directed spring force on said control slide valve.

6. A hydraulic control device according to claim 1, wherein said control slide valve is formed in two parts rigidly fastened together and located juxtaposed in the axial direction of said slide valve, each of said two parts having formed thereon one of said second pair of valve seats.

* * * * *